US007254299B2

(12) United States Patent
Izhaky et al.

(10) Patent No.: US 7,254,299 B2
(45) Date of Patent: Aug. 7, 2007

(54) HIGH-TOLERANCE BROADBAND-OPTICAL SWITCH IN PLANAR LIGHTWAVE CIRCUITS

(75) Inventors: Nahum Izhaky, Kefar-Sava (IL); David Oaknin, Rosh Haayin (IL); Eran Brand, Kiron (IL); Shay Caspi, Givataym (IL)

(73) Assignee: Lynx Photonic Networks, Inc., Calabasas Hills, CA (US)

( * ) Notice: Subject to any disclaimer, the term of this patent is extended or adjusted under 35 U.S.C. 154(b) by 7 days.

(21) Appl. No.: 10/763,326

(22) Filed: Jan. 26, 2004

(65) Prior Publication Data

US 2004/0151423 A1 Aug. 5, 2004

Related U.S. Application Data

(63) Continuation-in-part of application No. 10/098,391, filed on Mar. 18, 2002, now abandoned.

(60) Provisional application No. 60/341,240, filed on Dec. 20, 2001.

(51) Int. Cl.
*G02B 6/26* (2006.01)
*G02B 6/42* (2006.01)

(52) U.S. Cl. .............................. 385/48; 385/39; 385/42; 385/43; 385/50

(58) Field of Classification Search ................... 385/48
See application file for complete search history.

(56) References Cited

U.S. PATENT DOCUMENTS

| 4,262,992 | A | * | 4/1981 | Berthold, III ................. 385/15 |
|---|---|---|---|---|
| 4,674,827 | A | * | 6/1987 | Izutsu et al. ................ 385/132 |
| 4,775,207 | A | | 10/1988 | Silberberg |
| 4,846,540 | A | * | 7/1989 | Kapon ......................... 385/45 |
| 4,850,666 | A | * | 7/1989 | Izutsu et al. ................ 385/132 |
| 4,998,793 | A | * | 3/1991 | Henry et al. ..................... 385/1 |

(Continued)

OTHER PUBLICATIONS

Hwang et al, "Polymeric 2x2 Electrooptic Switch Consisting of Asymmetric Y Junction and Mach-Zehnder Interferometer", IEEE Photonics Tech. Letters, vol. 9 No. 6, Jun. 1997.*

(Continued)

*Primary Examiner*—Frank G. Font
*Assistant Examiner*—Ryan Lepisto
(74) *Attorney, Agent, or Firm*—Mark M. Friedman (57) ABSTRACT

Broadband optical switches based on adiabatic couplers having a pair of asymmetric waveguides with variable curvature sections include in a 2x2 configuration based on a Mach-Zehnder interferometer two such adiabatic couplers, and in a 1x2 or 2x1 configuration an adiabatic coupler and an Y-splitter. Each adiabatic coupler includes two waveguide branches of different but constant widths having curved sections with varying radii, separated over a coupling length by a changing spacing therebetween and blending in an asymmetric intersection area, and two symmetric branches. In the 2x2 switch, the two adiabatic couplers face each other with their respective symmetric branches, and are connected by the two identical arms along a main propagation axis in a mirror image. The utilization of the variable curvature adiabatic couplers in silica MZI switches on a silicon substrate provides switches with an exceptional broadband range (1.2-1.7 μm), very high extinction ratios (>35 dB), low fabrication sensitivity and polarization independent operation. The switches are significantly smaller than known broadband switches, have significantly smaller excess loss, faster switching time and low power consumption.

12 Claims, 4 Drawing Sheets

U.S. PATENT DOCUMENTS

| | | | | |
|---|---|---|---|---|
| 5,022,731 | A | * | 6/1991 | Maerfeld et al. ............ 359/332 |
| 5,293,436 | A | * | 3/1994 | Diemeer ...................... 385/11 |
| 5,303,315 | A | * | 4/1994 | Granestrand ................. 385/16 |
| 5,375,178 | A | * | 12/1994 | Van Der Tol ................. 385/11 |
| 5,418,867 | A | * | 5/1995 | Van Der Tol ................. 385/11 |
| 5,418,868 | A | * | 5/1995 | Cohen et al. ................. 385/16 |
| 5,521,993 | A | * | 5/1996 | Lerminiaux et al. .......... 385/14 |
| 5,526,453 | A | * | 6/1996 | Wolf et al. ................... 385/42 |
| 5,528,708 | A | * | 6/1996 | Van Der Tol ................. 385/14 |
| 5,594,818 | A | * | 1/1997 | Murphy ........................ 385/8 |
| 5,611,007 | A | * | 3/1997 | Wolf et al. ................... 385/14 |
| 5,640,471 | A | * | 6/1997 | Khan et al. ................... 385/17 |
| 6,064,788 | A | * | 5/2000 | Khan et al. ................... 385/45 |
| 6,078,605 | A | * | 6/2000 | Little et al. ................... 372/94 |
| 6,856,751 | B2 | * | 2/2005 | Oaknin et al. ............... 385/140 |
| 6,915,047 | B1 | * | 7/2005 | Mekis et al. .................. 385/48 |

OTHER PUBLICATIONS

Smith et al, "A Mode-Evolution-Type Integrated-Optical Beam Combiner for Coherent Receivers", IEEE Photonics Tech. Letters, vol. 3 No. 4, Apr. 1991.*

Kitoh T. et al. "*Novel broad-band optical switch using silica-based planar circuit*", IEEE Photon. Technol. Lett. 4, pp. 735-737, 1992.

Henry C. H. et al. "*Analysis of mode propagation in optical waveguide devices by Fourier expansion*", IEEE J. Quantum Electron. 27 pp. 523-530, 1991.

* cited by examiner

HIGH-TOLERANCE BROADBAND-OPTICAL SWITCH IN PLANAR LIGHTWAVE CIRCUITS

CROSS REFERENCE TO EXISTING APPLICATIONS

The present application is a continuation in part of U.S. patent application Ser. No. 10/098,391 filed 18 Mar. 2002, which claims priority from U.S. Provisional Application No. 60/341,240 filed 20 Dec. 2001.

FIELD AND BACKGROUND OF THE INVENTION

The rapid progress in modern telecommunication brings with it an increasing demand for a fast and efficient way to rout information between many users. As optical fibers replace old copper wires, a need for a low-cost direct optical switching is rising. Such optical switching components should operate within contemporary communication network systems that support Dense Wavelength Division Multiplexing (DWDM) for various applications, such as optical add drop multiplexing (OADM), optical cross connections (OXC), protection, restoration, etc.

In order to achieve higher capacity more communication channels are required. Therefore, a broader bandwidth of optical components is essential. Such broadband components must be fabricated in large numbers with low cost and high reliability. Reliable solid-state devices with no moving parts are suitable for mass production, as was demonstrated in the microelectronics industry. Planar lightwave circuit (PLC) technology is one of the most promising solid-state technologies, and a Mach Zehnder-Interferometer (MZI) is one of the most successful and useful structures built in this technology.

The MZI was invented more than century ago. It has been extensively used in the design of all-optical switches, filters, attenuators, etc. However, a standard MZI is not broadband, due to the high wavelength dependency of its couplers, and in some configurations, also due to the length difference between its two arms.

Few attempts to produce broadband MZI optical switches were made in the past. One approach, for thermo-optical silica-based switches, proposes Wavelength-Insensitive Couplers (WINCs) instead of directional couplers, where each WINC is actually a complete MZI by itself (Kitoh T. et al. "*Novel broad-band optical switch using silica-based planar circuit*", IEEE Photon. Technol. Lett. 4, pp. 735-737, 1992). This device is very long and uses three electrical drivers and three active electrodes, thus having complicated control and consuming high electrical power. In addition, its Extinction Ratio (ER) performance is insufficient—17 dB over the spectral range of 1.25-1.65 µm.

Cohen et al. in U.S. Pat. No. 5,418,868 employed broadband adiabatic couplers (first described by Henry C. H. et al. "*Analysis of mode propagation in optical waveguide devices by Fourier expansion*", IEEE J. Quantum Electron. 27 pp. 523-530, 1991) in their proposed MZI switch. At the core of the couplers are two closely adjacent waveguides of gradually varying widths, layed out so that the separation between the two is constant. These couplers and MZI switches have a few disadvantages: they must be very long in order to be adiabatic, and the coupling effect of the small (few µm) gap between the coupler's waveguides is very sensitive to fabrication, e.g. to over-etch, material stresses, etc., resulting in a deteriorated extinction ratio, or alternatively in a narrowed operational wavelength window. Under normal fabrication conditions, the ER over the spectral range of 1.25-1.6 µm is only 15 dB, which is also insufficient for most current applications.

Silberberg in U.S. Pat. No. 4,775,207 introduced 2×2 digital optical switches (DOS) via an electro-optic effect, and fabricated in materials such as Lithium Niobate (LiNbO$_3$) with large electro-optic coefficients. The proposed DOS has an optical step-like response to the switching voltage. It is based on an asymmetric waveguide junction structure, composed from two input waveguides of unequal width, a wide central region and a symmetric output branching. In contrast with a MZI, a DOS has only two functional states, controlled by the electrical field. This allows the incoming optical signals to be routed to either one of the output ports (i.e. a "digital" response instead of the useful analog response of MZI switches).

Hwang et al. in a paper named "Polymeric 2×2 electrooptic switch consisting of asymmetric Y-junctions and Mach-Zehnder interferometer", Photonics Letters, vol. 9, No. 6, June 1997 describe a 2×2 switch comprising a pair of couplers, each having two straight branches of different but constant widths, separated over a coupling length by a changing spacing therebetween. The branches blend in a symmetric intersection area. Because the branches are straight, the switch is by necessity large. Hwang et al. do not mention an extinction ratio, and it is unclear that the response is wavelength independent over a large range.

There is thus a widely recognized need for, and it would be highly advantageous to have a high-tolerance broadband MZI switch that does not suffer from the disadvantages of previous switches, as listed above, and which has in particular a wavelength independent response and higher ERs.

SUMMARY OF THE INVENTION

We have developed various embodiments of an optical MZI switch, which can be fabricated using standard PLC technologies, and which has a broader operational wavelength band and better process tolerance in comparison with other known optical switches. Furthermore, the optical switch of the present invention has much smaller dimensions than other broadband optical switches, without any tradeoff in other properties (ERs, loss, polarization dependent loss (PDL), power consumption, etc.).

Conventional MZI switches make use of directional couplers. However, such couplers have a wavelength-dependent response. In order to achieve a broadband switch operation, we have developed an improved adiabatic coupler with essentially flat characteristics over a wide range of wavelengths. Its key components are two curved waveguides of different widths characterized by continuously varying radii, which intersect forming a small angle, and blend into a symmetric structure so that smooth (adiabatic) conversion of optical modes occurs as the optical signals propagate towards the intersection. Modes of the wide/narrow waveguides are converted into symmetrical/anti-symmetrical modes respectively. An optional, wide intermediate waveguide is located immediately after the intersection, in which case two symmetrical output branches (e.g., S-bends) separate the modes to two output signals that are, depending on the symmetry of the mode, either in phase or having a phase difference of π radians.

The invention makes a unique use of two input waveguide branches of different widths, each having a significant curved section in which the curvature changes, preferably continuously. That is, each such branch has a "variable curvature" section composed of preferably continuous subsections with different local radii. The local radii may vary from a very small radius (tending to zero) to a very large radius (tending to infinity). The small radii sub-sections of the two branches allow us to swiftly bring the input waveguides (which, at their input interface or "proximal end" are far enough to be optically uncoupled) closer to each other, thus reducing significantly the device dimensions. The radii of the curved sections increase smoothly as the gap between the branches decreases, until the curved sections turn into straight waveguide sections near a point where the branches intersect. This geometry preserves the adiabatic characteristics.

This coupler design was found to have a high tolerance to process related perturbations such as over-etch, deviation of the media's refractive index from the expected value, etc. Moreover, its performance is superior to prior art designs of adiabatic couplers (broader bandwidth, better 3 dB characteristics, and higher tolerance) even though our improved 3 dB coupler is much shorter than prior art couplers. In particular, by using two input curved waveguides with continuously variable curvatures, device dimensions decrease significantly while the adiabatic characteristics are maintained. Moreover, by using S-bends at the output of the coupler instead of a linear adiabatic splitter, we further shorten the device while maintaining its quality of performance.

In a preferred embodiment, the couplers of the present invention are preferably integrated into a 2×2 MZI switch, which shows better performance (broader bandwidth, higher extinction ratios and higher tolerance) compared with other broadband optical switches. In another preferred embodiment, a 1×2 (or, if reversed, a 2×1) optical switch is obtained by replacing one of the adiabatic couplers with a Y-splitter. The Y-splitter has a very broad bandwidth, which, at a minimum, encompasses the bandwidth of the adiabatic coupler. It also provides, when used within a 1×2 (or 2×1) MZI switch, more symmetrical extinction ratio characteristics for the two outputs (or inputs) relative to the 2×2 switch.

The optical switch of the present invention can be used, as is, to direct light in an optical network. It can also be integrated into a large circuit of planar waveguides containing a few switches and other optical components.

According to the present invention there is provided a 2×2 optical switch having a main propagation axis, comprising a first 3 dB adiabatic coupler having a first pair of constant width, asymmetric waveguide branches, each branch extending between a proximal end and a distal end, each branch having a curved section with a variable curvature, the branches separated over a coupling length by a changing spacing therebetween and blending in a symmetric intersection area at the distal end, and two symmetric branches connected to the intersection area at the distal end; a second 3 dB adiabatic coupler having a first pair of constant width, asymmetric waveguide branches, each branch extending between a proximal end and a distal end, each branch having a curved section with a variable curvature, the branches separated over a coupling length by a changing spacing therebetween and blending in a symmetric intersection area at the distal end, and two symmetric branches connected to the intersection area at the distal end, wherein the first and second adiabatic couplers face each other along a main optical propagation axis in a mirror image; two identical arms connecting the first and second pairs of symmetric branches optically to each other along the main propagation axis; and at least one active element coupled to at least one of the identical arms for dynamically changing an optical property of at least one arm, whereby the implementation of the switch in a planar lightwave circuit provides a switch that is significantly smaller than prior art switches, is practically polarization independent, and has a low loss and a very high extinction ratio over an exceptionally broad band range.

According to the present invention there is provided a 2×1 optical switch having a main propagation axis, comprising: a Y-splitter that includes an input waveguide and a pair of symmetric splitter branches; a 3 dB adiabatic coupler having a first pair of constant width, asymmetric waveguide branches, each branch extending between a proximal end and a distal end, each branch having a curved section with a variable curvature, the branches separated over a coupling length by a changing spacing therebetween and blending in a symmetric intersection area at the distal end, and two symmetric coupler branches connected to the intersection area at the distal end, the Y-splitter and the adiabatic coupler facing each other with their respective symmetric branches along a main optical propagation axis in a mirror image; two identical arms connecting the pairs of symmetric splitter and coupler branches optically to each other along the propagation axis; and at least one active element coupled to at least one of the identical arms for dynamically changing an optical property of the arm, whereby the implementation of the switch in a planar lightwave circuit provides a switch that is significantly smaller than prior art switches, is practically polarization independent, and has a low loss and a very high extinction ratio over an exceptionally broad band range.

According to the present invention, there is provided a 3 dB broadband adiabatic coupler, comprising: a pair of constant width, asymmetric waveguide branches, each branch having a curved section with a variable curvature, the branches separated over a coupling length by a changing spacing therebetween, and blending in a symmetric intersection area at a distal branch end; and two symmetric branches connected to the intersection area at the distal end.

In general, the continuously varying radii (variable curvature) bends can be replaced by a discrete number of different circular bends with monotonically increasing or decreasing radii values, provided that the curvature difference between consecutive bend sections is small enough to maintain adiabatic characteristics. The derivative of the curvature in the interface between two consecutive bends does not necessarily equal zero. A particular case of the curved waveguide is represented by two straight non-parallel waveguides (R->infinity) with different widths and with a small angle between them.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a broadband optical switch based on a broadband adiabatic 3 dB coupler within MZI configurations, which is preferably fabricated using standard PLC technologies, and which has broader operational wavelength band and better process tolerance in comparison with other known optical switches. The optical switch of the present invention can be made much shorter than other broadband optical switches, without any tradeoff in other properties (extinction ratio, loss, PDL, power consumption, etc.).

All waveguides in the present invention support, unless otherwise specified, a single optical mode for all relevant wavelengths. However, waveguides that support a second optical mode can sometimes be used, provided that only the fundamental mode is excited during operation. This usually dictates a typical waveguide width of a few μm for switches designed to operate in the standard infrared bands of commercial optical communication networks.

The principles and operation of a broadband optical switch according to the present invention may be better understood with reference to the drawings and the accompanying description.

Figure 1:
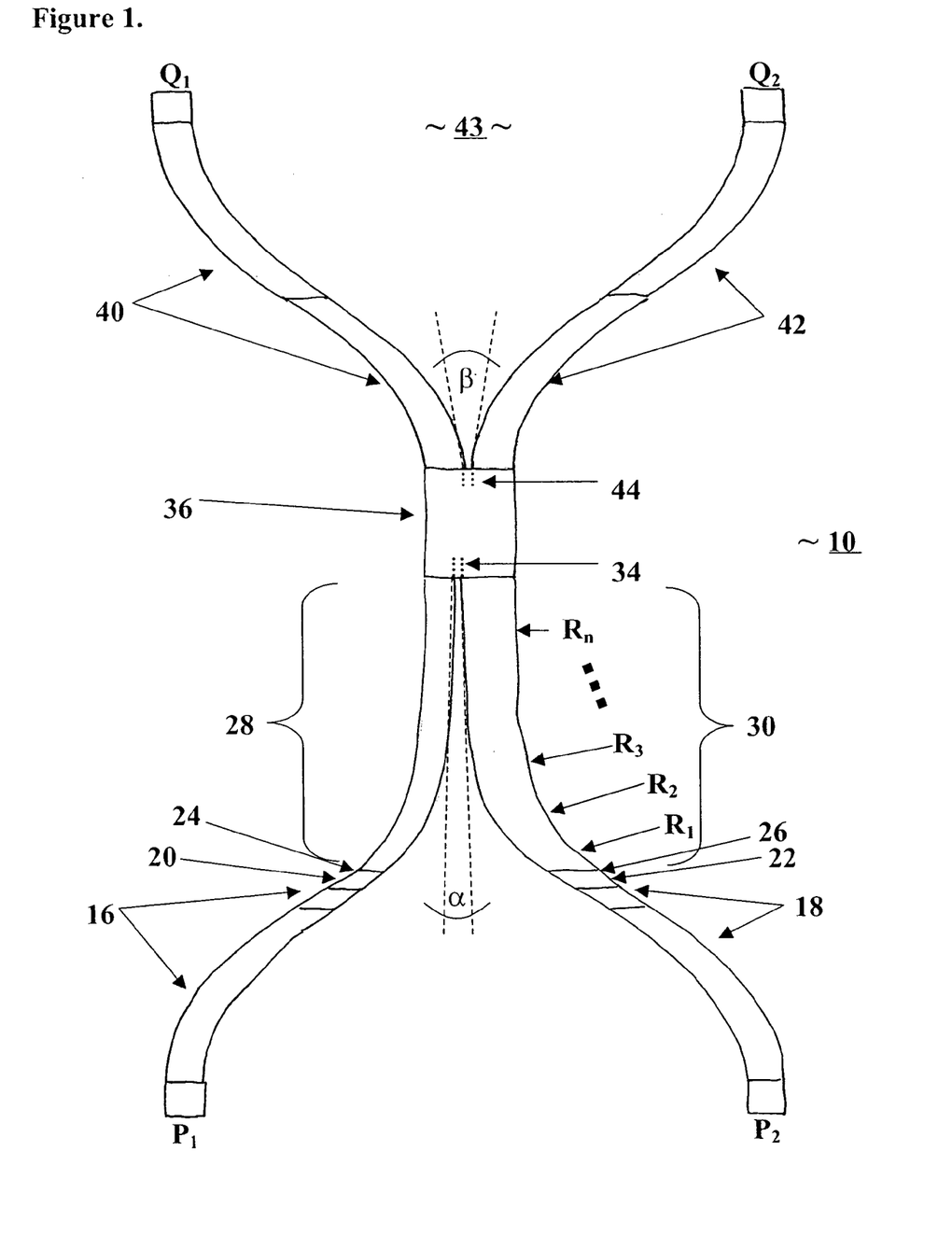
FIG. 1 is a schematic drawing of an improved adiabatic coupler as suggested herein, used for the construction of the optical switches.

Referring now to the drawings, FIG. 1 illustrates an exemplary embodiment of an adiabatic coupler 10 used for the fabrication of the optical switch of the present invention. Elements of FIG. 1 have been rescaled for clarity, and do not necessarily represent actual proportions. Coupler 10 has a typical size (length) of 1-3 millimeters. FIG. 1 shows coupler 10 with two input waveguides (ports) $P_1$ and $P_2$ that can connect the coupler (and the switch incorporating it) to other integrated components on the optical chip, or to any other light inputs. In order to bring the two input waveguides $P_1$ and $P_2$ into a close enough proximity, two bends 16 and 18 are used. Bends 16 and 18 reduce the distance between waveguides $P_1$ and $P_2$, while keeping the size of the component as short as possible. On the other hand, the distance between waveguides $P_1$ and $P_2$ at the end of the bends (near two adiabatic tapers 20 and 22 respectively) should be still large enough to suppress evanescent mode coupling between the two waveguides. Adiabatic tapers 20 and 22 end in ends 24 and 26 respectively and are used to vary the width of one or both waveguides. Thus, at ends 24 and 26, the two waveguides have different widths. Tapers 20 and 22 lead respectively to two asymmetric (width wise) waveguides or branches 28 and 30, each branch having curved sections with a variable curvature (a plurality of preferably smoothly and monotonically changing radii). In FIG. 1, coupler branch 28 is narrower and coupler branch 30 is wider. This choice is an arbitrary design choice in the sense that in other embodiments, branch 28 may be the wider one, and branch 30 the narrower one. Branches 28 and 30 start each at a proximal end defined respectively by ends 24, 26, and end at a common distal end 34 close to the beginning of an intersection area 36. Intersection area 36 may be infinitely thin (in the direction of light propagation), or as described below, may include a mediating waveguide. The varying radii are shown for the curved section in branch 30 by discrete symbols $R_1, R_2, R_3, \ldots R_n$, where n may be a finite number, but preferably infinite (i.e. the radii vary continuously from 0 to infinity). Similar radii (not shown) defined the curved section of branch 28. In practice, due to fabrication limitations, the number of different radii (or curved sub-sections) along each branch will be finite. The continuously variable curvature sections of branches 28 and 30 can be approximated and replaced by a series of discrete circular bends with monotonically varying radii values. The derivative of the curvature in the interface between two consecutive bends does not necessarily equal zero. In the particular case in which $R \to \infty$ the coupler branches geometry is defined by two straight non-parallel waveguides ($R \to \infty$) with different widths and with a small angle between them.

The width change induced by tapers 20 and 22 may be equal or non-equal (and of equal or opposite sign); the important feature is that coupler branches 28 and 30 that start respectively at ends 24 and 26 have different (and each by itself constant) widths. For, example, in FIG. 1, branch 28 is narrowed (hereafter "narrow branch 28") and branch 30 is widened (hereafter "wide branch 30") by the same amount using the tapers, relative to input waveguides $P_1$ and $P_2$. The small radii at the proximal end (e.g. $R_1$) are needed to quickly reduce to distance between the two branches and to minimize the coupler length. This does not spoil the adiabatic behavior, since the initial distance between the branches (at the proximal end) is sufficiently large so that the optical coupling between them is very small. As the gap between branches 28 and 30 decreases and the coupling between them increases, larger curve radii (e.g. $R_n$) are needed in order to maintain adiabatic conversion of the modes. Advantageously, and in contrast with prior art, the use of suitable varying radii curves provides very small coupler dimensions while maintaining adiabatic requirements. As they approach distal end 34, branches 28 and 30 become straight non-parallel waveguides that intersect at an angle α small enough for the coupler to remain sufficiently adiabatic. Typically, α is less then 0.15°.

Tapers 20 and 22 may be placed in any section of the two waveguides between the input ports and branches 28 and 30. For example, the tapers may be placed before bends 16, 18 (just after the input ports), after the bends (as shown in FIG. 1), or anywhere along the bends. Narrow branch 28 and wide branch 30 are laid out so that the spacing in between the two becomes smaller with distance from ends 24 and 26 until they intersect at distal end 34 and blend into a symmetric structure. In contrast with prior art couplers, the internal (proximal) edges of branches 28 and 30 are not parallel over the length of the light coupling interaction, i.e. from ends 24 and 26 to area 36. The combination of non-equal width branches separated by a changing spacing therebetween using variable curvature waveguide sections with preferably continuously varying radii constitutes a key innovative feature of the coupler (and switches) of the present invention. This feature, and its attendant advantages in terms of size and adiabatic coupling performance are unparalleled in prior art. This feature is not found in any prior art coupler or switch, including Hwang et al. and Cohen '868, and is responsible for a significant performance improvement, as shown later herein.

In order to improve the fabrication insensitivity of the switch, intersection area 36 can be modified in a number of ways. For example, intersecting branches 28 and 30 can be shifted sidewise (separated from each other so that their meeting is not at a single point) by a small amount, so that a small intersection blunt 34 is formed between the waveguides at the interface with intersection area 36 or with an optional mediating waveguide 36. Mediating waveguide 36 is preferably a wide (on the order of the combined width of branches 28 and 30) and relatively short (relative to the coupler) symmetric waveguide placed after the intersection of branches 28 and 30. Mediating waveguide 36 should support at least two optical modes-symmetric and anti-symmetric. By introducing blunt 34, the sharp intersection angle, which common fabrication processes cannot produce properly, is avoided. The blunt must be small enough to avoid significant transition loss.

Optional bend elements can be inserted between tapers 20, 22 and branches 28 and 30 respectively, and between these branches and mediating waveguide 36 in order to realize an adiabatic adjustment of the optical propagation pathways to the slightly different angular orientations of branches 28 and 30. Without the optional mediating waveguide, branches 28 and 30 can be connected directly at distal end 34 to, respectively, two completely symmetrical branches 40 and 42 of a symmetrical side 43 of the coupler. However, mediating waveguide 36 improves tolerance, and can reduce optical transition loss. Symmetric branches 40 and 42 connect mediating waveguide 36 to two coupler output ports $Q_1$ and $Q_2$ respectively. The lengths and radii of symmetrical branches 40 and 42 may be equal to or different from those of input bends 16 and 18. Symmetrical side 43 may include bends, similar to input bends 16 and 18. As with blunt 34, a small blunt 44 may be introduced between the symmetrical branches 40 and 42 at interface 46 with mediating waveguide 36, in order to improve the tolerance to fabrication. An angle β between of symmetrical branches 40 and 42 at interface 46 can also be optimized for the specific realization. β is generally on the same order as α.

The geometry of mediating waveguide 36 can be further optimized for a specific embodiment and process parameters, as long as the element retains it symmetry relative to the propagation axis, so that no transitions occur between symmetrical and anti-symmetrical modes. For example, the geometry optimization may include varying its length or width, changing its width continuously (namely forming a taper), splitting part of mediating waveguide 36 into two parallel waveguides, etc. Notwithstanding the limitation cited above, small deviations from symmetry, such as lateral offsets of mediating waveguide 36, a tilt, etc. may sometime be used in order to compensate for any asymmetry of the optical transition from coupler branches 28, 30 to mediating waveguide 36, and from mediating waveguide 36 to branches 40, 42. Another way to achieve the same goal is to place an active element on mediating waveguide 36 that is able to change mediating waveguide's 36 refractive index.

In operation, any signal reaching adiabatic coupler 10 through port P2 that is connected to wide branch 30, should exit the coupler converted into a symmetric output mode. Thus, symmetric branches 40 and 42 hold signals that propagate in phase while carrying, each one, fifty percent of the total input power from P2. Any signal reaching the adiabatic coupler through narrow branch 28 (i.e. input through port P1) should exit adiabatic coupler 10 converted into an anti-symmetric output mode. Thus, symmetric branches 40 and 42 hold coherent signals which propagate with a relative phase difference of π while carrying, each one, fifty percent of the total input power from P1. This behavior is practically wavelength insensitive and polarization independent on a broad bandwidth.

The optical characteristics of the coupler are completely reversible, namely, identical coherent (and in phase) inputs through port Q1 and Q2 (symmetrical input) should result in an output through the wide branch (port P2). A phase difference of π between the input signals through Q1 and Q2 (anti-symmetrical input) should result in an output through the narrow branch (port P1).

The coupler can also be modified in order to get a different partition of power between the two outputs (for example, 60% instead of 50% of the input power in one of the output ports) if branches 40 and 42 are not symmetric. This can be achieved if their widths are not equal, or if they form different angles with the propagation axis at their interface with mediating waveguide 36, or both.

Figure 2:
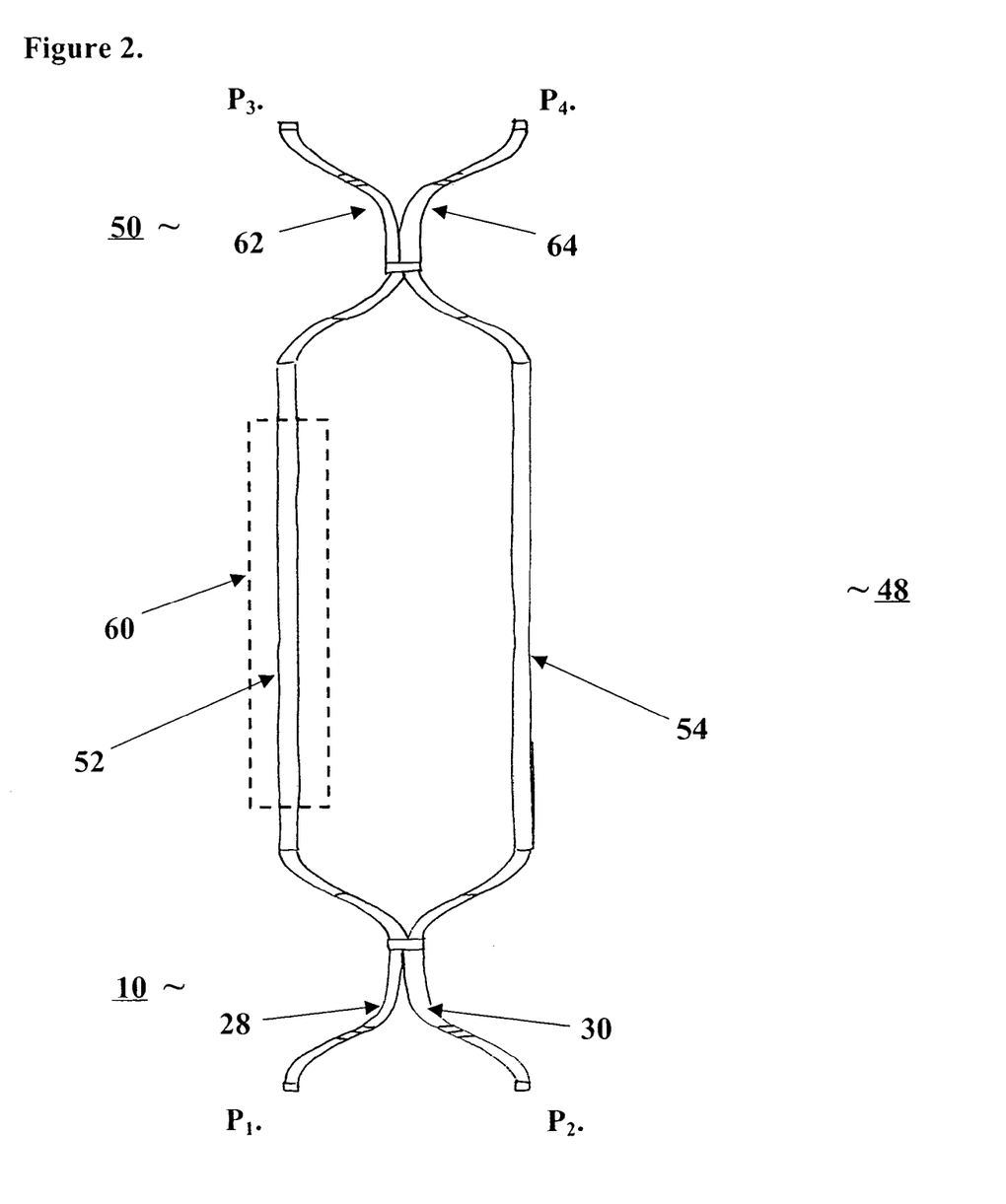
FIG. 2 is a schematic drawing of an embodiment of a broadband MZI 2×2 optical switch, comprising two adiabatic couplers, two arms and an active component.

FIG. 2 shows an exemplary embodiment of a complete 2×2 MZI switch 48. As in FIG. 1, this is a schematic rescaled figure, and the actual proportions might be quite different. The switch is composed of two adiabatic couplers of the type described above: an input coupler 10 with two input ports P1 and P2, and a reversed output coupler 50 with two output ports P3 and P4, which is a mirror image of input coupler 10 with respect to the plane orthogonal to the optical propagation axis. Preferably, couplers 10 and 50 are identical. However they may be generally non-identical. The MZI arms are two well-separated waveguides 52 and 54 that connect the inward branches of the two couplers. Arms 52 and 54 must have identical cross-sections and equal length, so that, in the passive state of the switch, no excess phase difference is generated between the modes in the arms. In the simplest embodiment, arms 52 and 54 are simply straight parallel waveguides.

An active element 60 that controls the switch is located in proximity to (usually above, due to heat sink issues or on both sides of) one or both of the MZI arms. FIG. 2 shows such an element on arm 52. Element 60 changes, in a well-known way, the optical length of the light propagating through the arm, via a modification of the refractive index in the arm. Preferably, the same active element structure (e.g. a metal electrode) is fabricated along both arms to preserve symmetry, even if one of the active elements is never actually used (always passive). Moreover, a fabrication process-induced asymmetry of the arms, or coupler related phase-difference deviation from the desired value, may result in a shift of the minimal/maximal transmission point from the passive (zero voltage) operational state. This shift can be corrected by applying an active adjustment of the index in one of the arms at the OFF-state, thus improving the ER of the switch. If the active component can only increase/decrease the refractive index (e.g. a thermo-optical heater), and if only one active component is fabricated, it can only actively correct the passive state when the minimal transmission point has shifted towards the one (positive voltage) side of the transmission characteristics of that active component. However, if active elements are fabricated on both MZI arms, each with its own independent power control, there can always be active compensation for the asymmetry effect, because instead of lowering the index on one arm we can increase the index on the other arm, whichever side the zero transmission point (OFF-state) has moved to. The active elements may be implemented in a number of different embodiments, as follows: some materials (such as silica), commonly used for the fabrication of planar integrated optical devices, have relatively high thermo-optic coefficients. When the optical media is made from such materials, a suitable choice for the active element may be an electric heater (a resistor), connected to a controllable voltage source. The heater raises the temperature of the media when electrical current passes through it. In this case, the two arms of the MZI should be well separated so that they would be thermally isolated from each other. For materials with high electro-optic coefficients (e.g. $LiNbO_3$) the active element may be composed of few electrodes, connected to a controllable voltage source. The electrostatic field generated by the electrodes mediates a change in refractive index of the optical media.

The active element may be designed to generate stress. An application of stress to the wafer can cause a refractive index changes via the photo-elastic effect. Other types of active elements can be used as well, provided that they mediate a sufficient optical phase shift.

In operation, without any refractive index changes in the arms, light inserted into switch 48 from port P1 through narrow branch 28 of input coupler 10 will be emitted through a narrow branch 62 and port P3 of output coupler 50. Similarly, light inserted through P2 and wide branch 30 of coupler 10 will exit through a wide branch 64 and port P4 of coupler 50. This is a passive "bar" state of switch 48. A passive "cross" state of the switch, i.e. when light input from P1 is output at P4, and light input at P2 is output at P3, is obtained when output coupler 50 is replaced by its mirror image with respect to the optical propagation axis.

An operational change from a bar to a cross state or vice versa can be achieved by turning on the active element 60 (for example, in one embodiment, applying voltage to a heater) so that we shift the phase of the light signal in the corresponding arm of the MZI switch. A phase shift of $\pi$ will result in reversal of the switching state, from bar to cross (or from cross to bar, if cross is the passive state). Although different wavelengths require different changes of the refractive index to achieve a $\pi$ phase shift, this does not spoil the broadband extinction ratio in the output port which is turned off in the passive operational state, though this may cause some loss at that port (typically 0.3-0.5 dB). Furthermore, this loss can be eliminated altogether if the switch operates within applications in which the wavelength of the incoming signal is always known beforehand (e.g., real time power/wavelength monitoring), so the switch can be dynamically adapted to this wavelength (by resetting the operation switching power to the specific value needed in that case). The passive state of the MZI switch is less sensitive to deviation from exact 3 dB power split of the couplers if the two couplers are identical. This property can be exploited in well-designed photonic circuit architectures.

Beside the 0 and $\pi$ phase shift states, the optical switch of the present invention can also operate in all intermediate (analog) states by producing only a partial phase shift between 0 and $\pi$ (partial heating power). It has therefore, besides the strictly ON-OFF switching application, many extended capabilities such as integrated optical output power control (e.g. Variable Optical Attenuator—VOA), built-in power equalization, multicasting, broadcasting etc.

Figure 3:
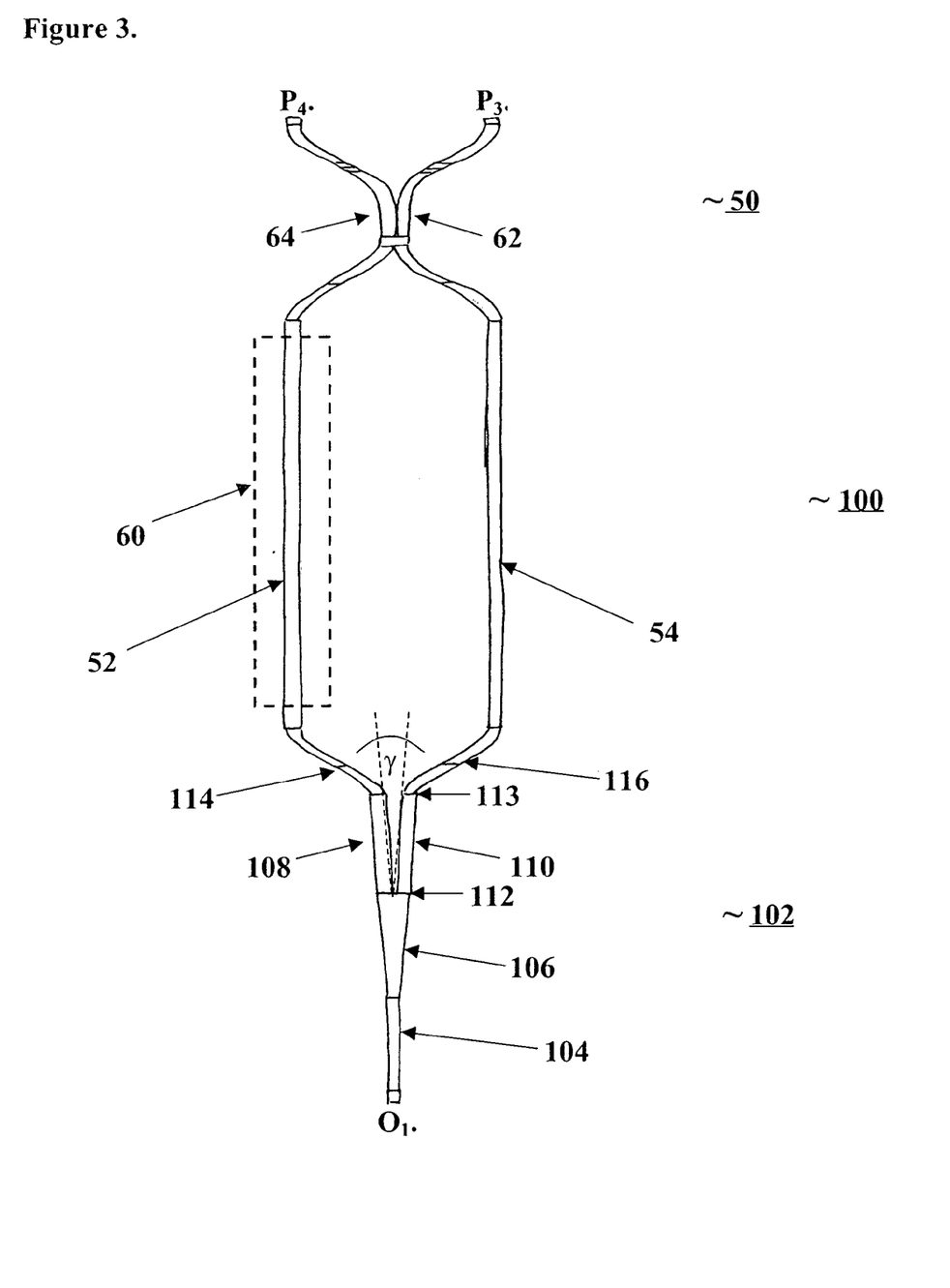
FIG. 3 is a schematic drawing of an embodiment of a broadband MZI. 1×2 optical switch, comprising an adiabatic Y-splitter, an adiabatic coupler, two arms and an active component.

FIG. 3 shows another embodiment of a MZI switch according to the present invention. This is a 1×2 switch 100 with one adiabatic coupler 50 and a Y-splitter 102. Splitter 102 has an input port $0_1$, connected through a preferably straight waveguide 104 to an adiabatic taper 106 of small angle $\gamma$. Taper 106 is designed to increase the width of waveguide 104, leading to a split into two symmetric waveguides (branches) 108, 110 of identical cross section, which intersect at an interface 112 with taper 106. A small blunt (not shown) may be fabricated between these waveguides at their meeting region with interface 112 in order to improve process tolerance. Symmetric straight waveguides 108 and 110 form a small angle $\gamma$ so that they depart adiabatically to a point 113 where two symmetrical bends 114 and 116 connect waveguides 108 and 110 respectively to two MZI arms 52 and 54. Alternatively, other symmetric output branches can be used in place of 108 and 110. Keeping the exit angle $\gamma$ small minimizes the losses of the component. The other components of the 1×2 switch are identical to those used to construct the 2×2 switch of FIG. 2, and are shown and numbered in FIG. 3 in a manner identical to that in FIG. 2.

In operation, an optical input inserted through port $O_1$ is converted in the Y-splitter to two optical signals of the same intensity and phase, in an essentially wavelength independent way. In the passive operational state, the symmetrical signal is transmitted through the adiabatic coupler to port P4 connected to "wide" branch 64.

In the active state, a difference in optical length between the arms yields a phase difference of $\pi$ between the signals propagating in the two arms. This anti-symmetrical signal is transmitted through the adiabatic coupler to port P3 connected to "narrow" branch 62. Thus, light inserted from port 01 can be switched to either output ports.

The 1×2 switch can operate also in reverse, as a 2×1 switch. In its passive state, the switch will transmit to output port $O_1$ only light inserted through the wide branch (input port P4). Optical inputs inserted through the narrow branch (at P3) will not be transmitted. By turning the active element 60 "ON", and mediating a $\pi$ optical phase difference between the arms, the input from the narrow leg is transmitted, and the other input is suppressed. In case of multicasting, VOA and other applications that utilize an intermediate phase difference between the arms, the optical element 60 can be used also in various intermediate states, so that only part of the light will be transmitted.

EXAMPLES

A broadband optical switch according to the present invention was designed and fabricated in Silica (waveguides) on Silicon (substrate) with $\Delta n=0.75\%$ (between the core and the clad of the waveguides) utilizing the thermo-optic effect.

Figure 4:
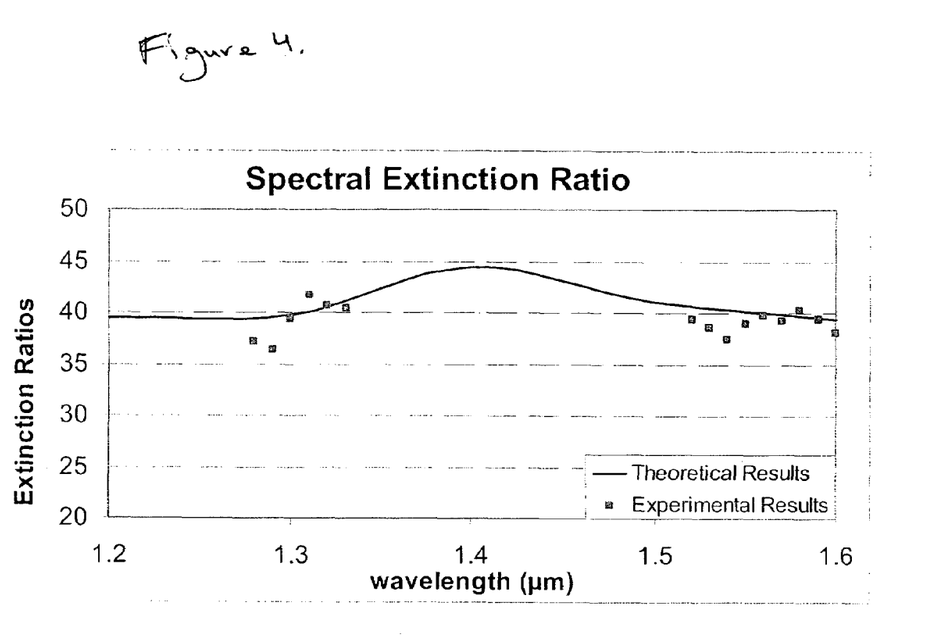
FIG. 4 shows theoretical and experimental extinction ratios results of the 2×2 broadband MZI switch as a function of wavelength.

The length of the 2×2 configuration (FIG. 2) was about 12 mm, whereas the length of the 1×2 configuration (FIG. 3) was about 10 mm. Both devices provided similar performances, except for a better extinction ratio (ER) of the 2×2 configuration at the cross output. The ER results (theoretical and experimental) of the 2×2 configuration as function of wavelength are depicted in FIG. 4. The theoretical results (full line), obtained via a vectorial finite-difference beam-propagation method, fit the experimental results (full circles) with very high accuracy.

The device was optimized for highest ER at the middle of the broad wavelength-band range. A very good agreement was obtained between experimental results and theory. Each point was measured at optimum OFF and ON voltages. Nevertheless, by using only one value for all OFF states and one value for all ON states (both optimized to wavelength 1.42 µm for all wavelengths), spectral ERs above 30 dB were obtained. Optimizing at wavelength 1.55 µm, yielded ERs of above 37 dB in the C+L bands, and ERs of above 25 dB in the 1.3 µm window. These ERs are significantly better than any reported to date in prior art switches, in major part due to the special geometry of the adiabatic couplers disclosed herein. The 1×2 configuration shows ERs of about 5 dB less than the 2×2, mainly due to its higher sensitivity to coupler deviation from 3 dB power split; however, it has similar ER in both outputs, and is shorter. If one requires a smaller window, e.g., S+C+L bands (which is still considered a broadband), similar results can be obtained with even shorter lengths, e.g. shorter than 10 mm.

The loss per switch was found to be 0.3 dB. The requirement for broadband operation, without prior knowledge of the input wavelength, produces an additional loss of up to 0.3 dB/sw. The polarization dependence of the new switch is also very low (<5 mW shift at the off state), and it is practically polarization independent. The power consumption is similar to a conventional MZI (0.1-0.5 W, depending on optical and metal layer designs). Switching time (rise and fall times, 10%-90%) is about 1 ms.

To conclude, the present invention discloses broadband solid-state optical switches, better than all their predecessors, and suitable for future requirements of optical communication networks. The switches advantageously use adiabatic couplers that have asymmetric waveguides with variable curvature curved sections. The variable curvature sections lead to significantly smaller devices with excellent extinction ratios. The importance of having smaller devices on an optical chip cannot be overemphasized. Prior art devices using straight coupler branches simply cannot be shortened without significantly affecting the adiabatic coupling and related performance.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A 2×0.2 optical switch having a main propagation axis, comprising:
    a) a first 3 dB adiabatic coupler having
        i) a first pair of constant width, asymmetric waveguide branches, each said branch extending between a proximal end and a distal end, each said branch having a curved section with a variable curvature, said branches separated over a coupling length by a changing spacing therebetween and blending in a symmetric intersection area at said distal end, and
        ii) two symmetric branches connected to said intersection area at said distal end,
    b) a second 3 dB adiabatic coupler having
        iii) a first pair of constant width, asymmetric waveguide branches, each said branch extending between a proximal end and a distal end, each said branch having a curved section with a variable curvature, said branches separated over a coupling length by a changing spacing therebetween and blending in a symmetric intersection area at said distal end, and
        iv) two symmetric branches connected to said intersection area at said distal end, wherein said first and second adiabatic couplers facing each other along the main optical propagation axis in a mirror image,
    c) two identical arms connecting said first and second pairs of symmetric branches optically to each other along the main propagation axis, and
    d) at least one active element coupled to at least one of said identical arms for dynamically changing an optical property of said at least one arm, whereby the implementation of the switch in a planar lightwave circuit provides a switch that is practically polarization independent, and has a low loss and a very high extinction ratio over an exceptionally broad band range.

2. The switch of claim 1, wherein said asymmetry of said waveguide branches includes different waveguide widths.

3. The switch of claim 1, wherein said variable curvature is defined by a finite number of different radii.

4. The switch of claim 1, wherein said variable curvature is defined by a plurality of smoothly and monotonically varying radii.

5. The switch of claim 1, wherein said curved waveguide sections are implemented as a series of discrete circular bends with different monotonically decreasing or increasing radii values.

6. The switch of claim 1, wherein said first and second adiabatic couplers are identical.

7. The switch of claim 1, wherein each said adiabatic coupler includes a pair of symmetric input/output bends, each said bend connected to a respective said curved section of a branch at said proximal branch end and configured to match the respective width of said branch.

8. The switch of claim 7, wherein at least one of said couplers further includes a mediating waveguide located between said intersection area and said symmetric branches.

9. The switch of claim 7, wherein said connection of each said bend to a respective curved section is mediated by an adiabatic taper.

10. The switch of claim 1, wherein said couplers and said identical arms are built of silica on a silicon substrate, and wherein said optical property of said arm includes an index of refraction of said arm.

11. The switch of claim 10, wherein said extinction ratio is selected from the group consisting of an extinction ratio of at least 30 in the C+L bands, and an extinction ratio of at least 32 in the 10.3 µm wavelength window.

12. The switch of claim 1, wherein said at least one active element coupled to at least one of said identical arms includes an active element on each of said identical arms, whereby a combined use of said two active elements can actively compensate for any asymmetry effect in said arms.

* * * * *